(12) United States Patent
Hipshier et al.

(10) Patent No.: US 10,086,767 B2
(45) Date of Patent: Oct. 2, 2018

(54) VEHICLE INTERIOR COMPONENT

(71) Applicant: Shanghai Yanfeng Jinqiao Automotive Trim Systems Co. Ltd., Plymouth, MI (US)

(72) Inventors: Jason Mathew Hipshier, Hudsonville, MI (US); Tyler James Newkirk, Grand Rapids, MI (US); Nikhil Shashikant Rane, Pune (IN); Alex D Vandertol, Grandville, MI (US)

(73) Assignee: Shanghai Yanfeng Jinqiao Automotive Trim Systems Co., Ltd., Novi, MI (US)

( * ) Notice: Subject to any disclaimer, the term of this patent is extended or adjusted under 35 U.S.C. 154(b) by 35 days.

(21) Appl. No.: 15/191,149

(22) Filed: Jun. 23, 2016

(65) Prior Publication Data

US 2016/0304031 A1 Oct. 20, 2016

Related U.S. Application Data

(63) Continuation-in-part of application No. PCT/US2014/071940, filed on Dec. 22, 2014.
(Continued)

(51) Int. Cl.
*B60R 7/04* (2006.01)

(52) U.S. Cl.
CPC ..................... *B60R 7/04* (2013.01)

(58) Field of Classification Search
CPC ...................................... B60R 7/04
(Continued)

(56) References Cited

U.S. PATENT DOCUMENTS 6,059,243 A 5/2000 Hikage et al.
6,616,205 B2 * 9/2003 Bruhnke .................. B60R 7/04
224/275

(Continued)

FOREIGN PATENT DOCUMENTS

DE 102013015490 A1 * 3/2015 ............ B60R 11/02
DE 102014218412 A1 * 3/2016 ............ B60N 3/106

(Continued)

OTHER PUBLICATIONS

European Patent Office Communication pursuant to Article 94(3) EPC for Application No. 14 825 238.0 dated Jun. 12, 2017.
(Continued)

*Primary Examiner* — Pinel E Romain

(57) ABSTRACT

A feature shown as trim piece or tab intended to provide a barrier or obstruction for items placed on top of the trim piece are disclosed. An interior trim component includes multiple substantially parallel ribs each configured to engage a track to facilitate movement of the interior trim component along the track. The interior trim component also includes a substrate having an outer surface and a rear surface. The outer surface is configured to face an interior of a vehicle and the rear surface is coupled to the substantially parallel ribs. The interior trim component further includes a barrier or obstruction extending upwardly from the outer surface while in an open position. The barrier or obstruction is configured to engage an item adjacent to the outer surface to block movement of the item relative to the interior trim component. The barrier or obstruction is configured to retract into a retracted position that facilitates movement of the interior trim component relative to a proximate structure.

20 Claims, 7 Drawing Sheets

Related U.S. Application Data

(60) Provisional application No. 61/920,341, filed on Dec. 23, 2013.

(58) Field of Classification Search
USPC .................................................. 296/38, 24.34
See application file for complete search history.

(56) References Cited

U.S. PATENT DOCUMENTS

| | | | |
|---|---|---|---|
| 7,735,538 B2 * | 6/2010 | Ogawa .................... | E06B 39/15 160/230 |
| 8,007,020 B2 * | 8/2011 | Hipshier ................... | B60R 7/04 296/24.34 |
| 8,235,442 B2 | 8/2012 | Spitler et al. | |
| 8,287,021 B2 * | 10/2012 | Penner .................... | B60N 3/101 296/24.34 |
| 8,579,348 B1 | 11/2013 | Myers | |
| 2003/0137158 A1 | 7/2003 | Nakanishi et al. | |
| 2008/0083517 A1 | 4/2008 | Ogawa | |
| 2009/0072568 A1 | 3/2009 | Luginbill et al. | |
| 2011/0049157 A1 | 3/2011 | Nakamura et al. | |
| 2014/0062103 A1 * | 3/2014 | Gillis ...................... | E05B 83/32 292/214 |
| 2015/0076853 A1 * | 3/2015 | Skolimowski .......... | B60R 11/02 296/63 |

FOREIGN PATENT DOCUMENTS

| | | | |
|---|---|---|---|
| WO | 2011143467 A1 | 11/2011 | |
| WO | WO-2017200983 A1 * | 11/2017 | ............... B60R 7/04 |

OTHER PUBLICATIONS

International Search Report dated Mar. 12, 2015 for PCT/2014/071940.

First Office Action from the State Intellectual Property Office of the People's Republic of China for CN Patent Application No. 201480076192.2 dated Feb. 24, 2018 (English translation) (8 pages).

* cited by examiner

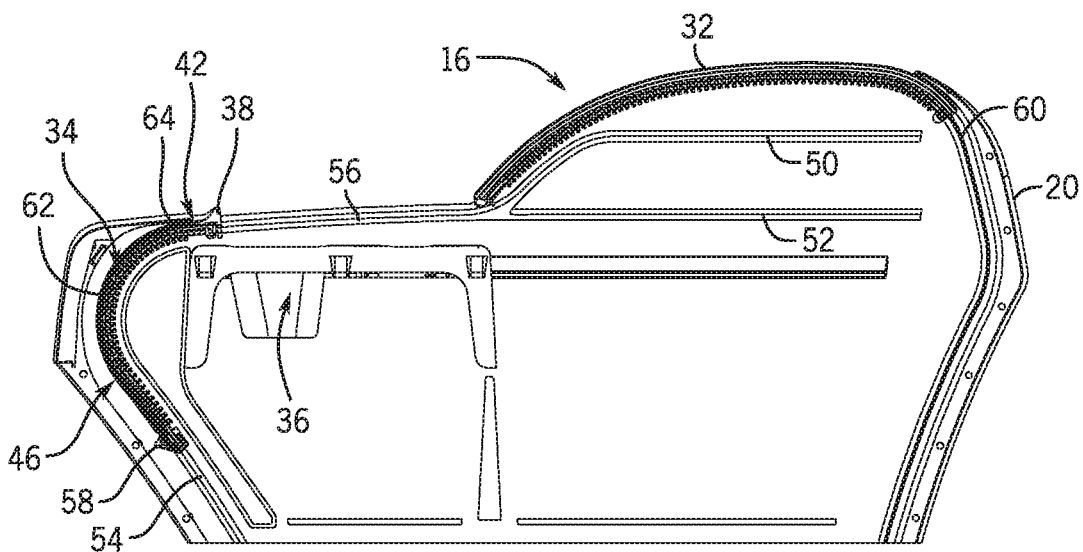
FIG. 5
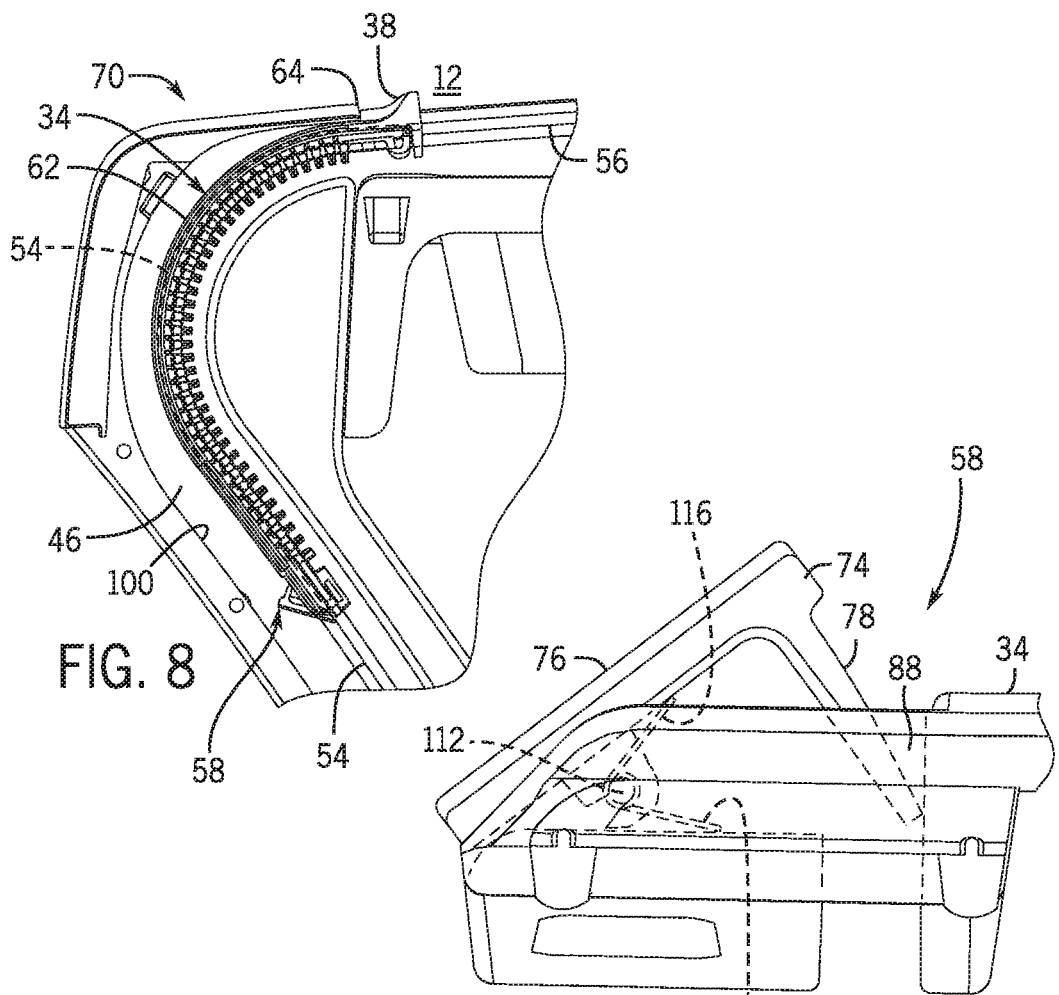
FIG. 8
FIG. 9

VEHICLE INTERIOR COMPONENT

CROSS REFERENCE TO RELATED APPLICATIONS

The present application is a continuation of international application PCT/US2014/071940 titled "FLEXIBLE INTERIOR TRIM COMPONENT HAVING A DEPLOYABLE RETAINING FEATURE" filed Dec. 22, 2014. The present application claims priority from and the benefit of and incorporates by reference in entirety of the following application: U.S. Provisional Patent Application No. 61/920,341 titled "FLEXIBLE INTERIOR TRIM COMPONENT HAVING A DEPLOYABLE RETAINING FEATURE" filed Dec. 23, 2013.

The present application claims priority from and the benefit of and incorporates by reference in entirety of the following applications: (a) PCT/US2014/071940 titled "FLEXIBLE INTERIOR TRIM COMPONENT HAVING A DEPLOYABLE RETAINING FEATURE" filed Dec. 22, 2014; (b) U.S. Provisional Patent Application No. 61/920,341 titled "FLEXIBLE INTERIOR TRIM COMPONENT HAVING A DEPLOYABLE RETAINING FEATURE" filed Dec. 23, 2013.

FIELD

The present invention relates to a vehicle interior component. The present invention also relates to a vehicle interior component such as a console having a storage compartment and door.

BACKGROUND

It is known in motor vehicles to provide a vehicle interior component such as a console (e.g. center console, floor console, etc.). It is also known to provide a storage compartment within the floor console or center console. It is further known to provide a door (e.g. tambour door, cover, etc.) for an opening such as the storage compartment within the console. In such an arrangement the door can be opened and retracted to allow and restrict access to the storage compartment. It is further known to configure the console to provide a receptacle into which the door is received when opened. It is further known to provide a handle on the door to facilitate opening and closing.

It would be advantageous to provide an improved vehicle interior component such as a console with a door for a storage compartment.

SUMMARY

The present invention relates to a vehicle trim component configured to provide support for an object. The vehicle trim component comprises a base, a door coupled to the base configured for movement from a retracted position to an open position through an intermediate position and a tab coupled to the door. The tab may be configured for movement from an open position to a retracted position. The base may comprise an edge configured to move the tab from the open position to the retracted position. The edge may be configured to move the tab from the open position to the retracted position as the door moves from the retracted position to the intermediate position and as the door moves from the intermediate position to the retracted position; the tab may comprise a tapered surface configured to contact the edge; the edge may comprise a lip. The tab may be configured to be in the open position when the door is in the retracted position and the open position; the tab may be configured to be in the retracted position when the door is in the intermediate position; the tab may be configured to move from the open position to the retracted position as the door is moved from the retracted position to the intermediate position. The tab may be configured to move from the retracted position to the open position as the door is moved from the intermediate position to the open position; the tab may comprise a spring configured to move the tab from the retracted position to the open position; the tab may be configured to prevent the object from moving relative to the door. The tab may be configured to retain the object as the door moves from the retracted position to the open position; the tab may be configured to move the object relative to the base as the door moves from the open position to the retracted position. The base may comprise an opening and wherein the tab is configured for movement from an open position to a retracted position as the tab moves through the opening. The door may comprise a handle; the handle contacts the edge to prevent movement of the door. The tab may be configured to be in the retracted position when the door is in the open position; the base may comprise a surface configured to prevent the tab from moving to the open position; movement of the tab comprises rotation. The base may comprise a console; the door may comprise a tambour door; the tab may comprise a deployable retaining feature; the retracted position may comprise a covering position; the open position may comprise a stowed position; the retracted position may comprise a second retracted position.

The present invention relates to a vehicle trim component. The vehicle trim component comprises a base, a door coupled to the base configured for movement from a closed position to an open position and a mechanism coupled to the door. The mechanism may comprise a tab configured for movement from a deployed position to a retracted position; the mechanism may comprise a spring configured to move the tab from the retracted position to the deployed position.

FIGURES

FIG. 5 is a schematic cross-section view of the console according to an exemplary embodiment.

FIG. 8 is a schematic cross-section detail view of the console according to an exemplary embodiment.

FIG. 9 is a schematic detail side view of the mechanism for a door of the console according to an exemplary embodiment.

DESCRIPTION

Figure 1A:
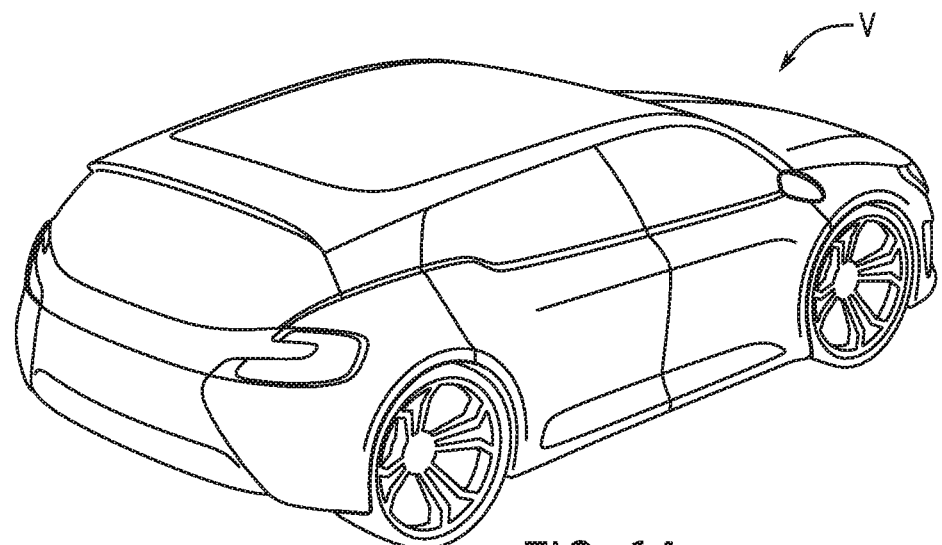
FIG. 1A is a schematic perspective view of a vehicle according to an exemplary embodiment.
Figure 1B:
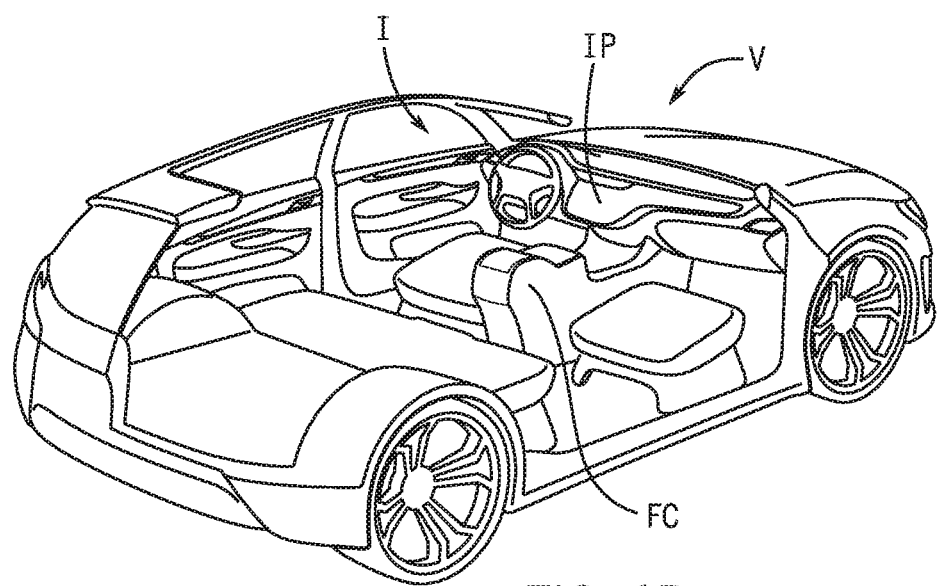
FIG. 1B is a schematic perspective cut-away view of the vehicle showing a vehicle interior according to an exemplary embodiment.

Referring to FIGS. 1A and 1B, a vehicle V is shown including an interior I with a console shown as a floor console FC and an instrument panel IP according to an exemplary embodiment; floor console FC comprises at least one door shown as a tambour door and a storage compartment within floor console FC; the tambour door facilitates access to the storage compartment according to an exemplary embodiment.

Figure 2:
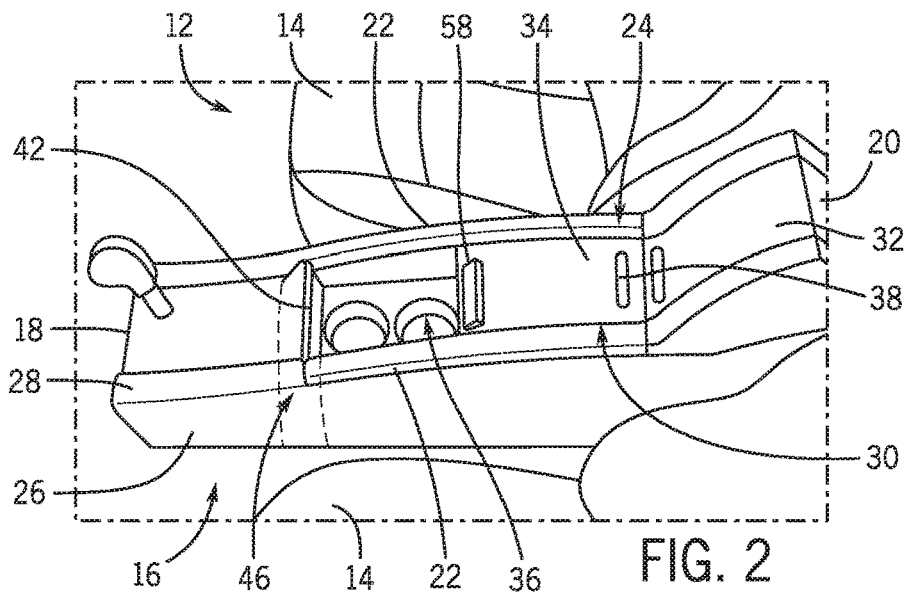
FIGS. 2, 2A and 3 are schematic perspective views of a vehicle interior showing a console according to an exemplary embodiment.
Figure 2A:
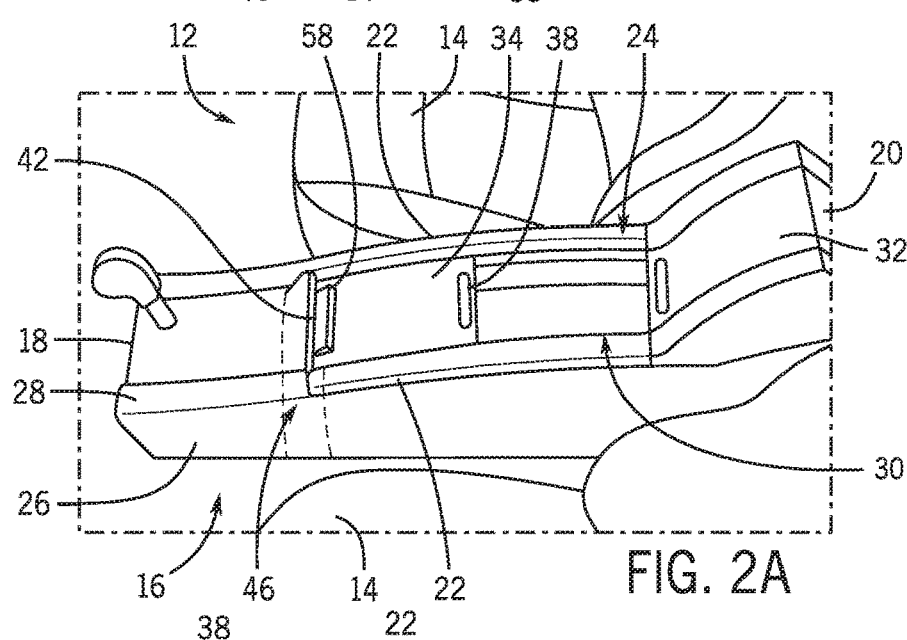
Figure 3:
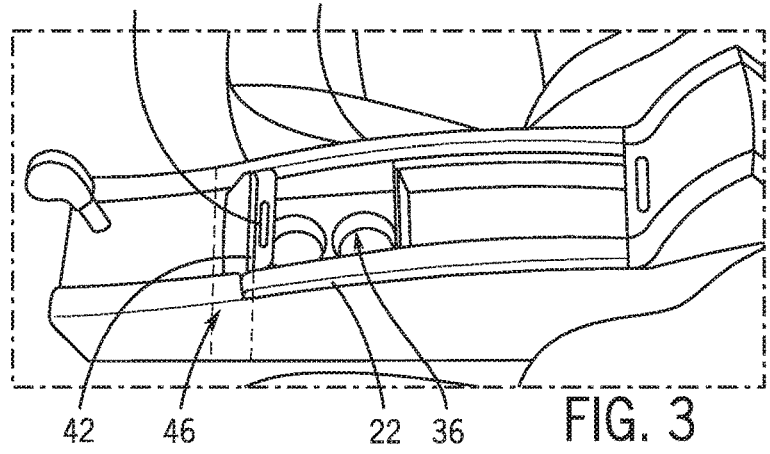

As shown schematically in FIGS. 2, 2A and 3, a vehicle interior 12 comprises a console shown as a center console 16 between the front seats 14 of the vehicle. Console 16 comprises a base and two doors shown as tambour door 32 and tambour door 34. As shown schematically in FIGS. 2, 2A and 3, the base of console 16 may provide an opening 30 configured to facilitate access of a storage compartment within console 16; the base of console 16 also provides a cup holder compartment 36. According to an exemplary embodiment, tambour door 34 is configured to facilitate access of the storage compartment within console 16 (see also FIG. 4A) and cup holder compartment 36.

As shown schematically in FIGS. 2, 2A and 3, tambour door 34 comprises a handle 38 to move tambour door 34 within console 16; the base of console 16 also comprises a compartment shown as a door stowage compartment 46 configured to store and substantially conceal tambour door 34 from view of vehicle occupants; according to an exemplary embodiment, both the storage compartment and cup holder compartment 36 are accessible to vehicle occupants when tambour door 34 is in compartment 46 (i.e. the open position). According to an exemplary embodiment, tambour door 34 enters compartment 46 through an opening 42 on the base of console 16. As shown schematically in FIG. 2, tambour door 34 comprises a mechanism providing a trim piece or edge shown as tab 58 (functioning as a deployable retaining feature); tab 58 is configured to act as a barrier or obstruction for items placed on top of tambour door 34; tab 58 is also configured to engage with the inner surface of opening 42 as tambour door 34 moves towards the open position according to an exemplary embodiment (see FIGS. 7A to 7C and 8B to 8D). As shown schematically in FIG. 2A, tambour door 34 is at an intermediate position; the edge of opening 42 is configured to move tab 58 from a deployed position towards a retracted position as tambour door 34 moves from the intermediate position to the open position. As shown schematically in FIG. 3, tambour door 34 is at the open position; tambour door 34 is inside of compartment 46.

Figure 4A:
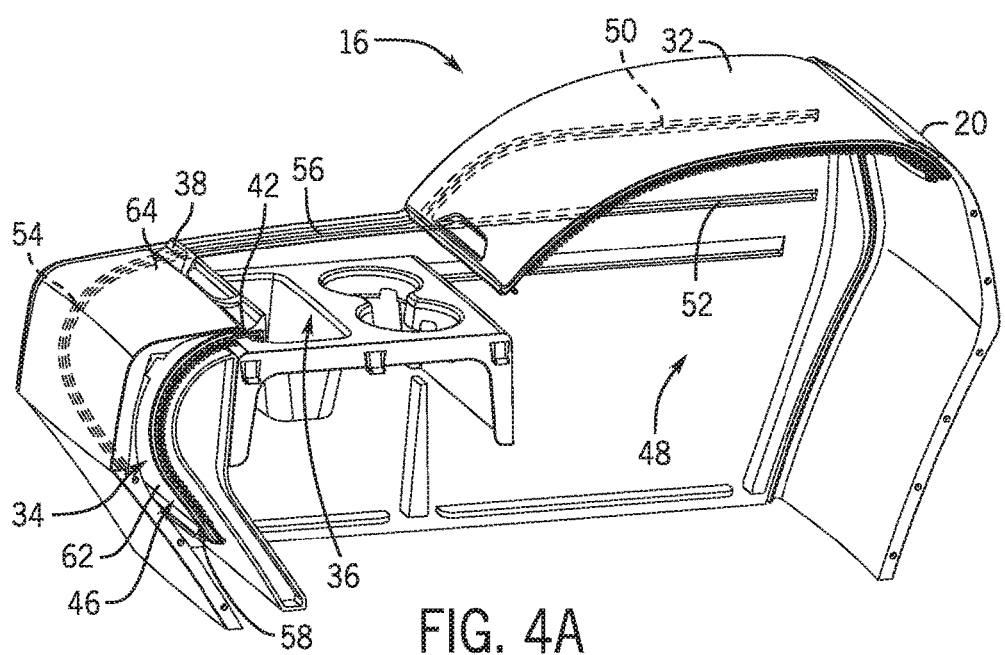
FIG. 4A is a schematic perspective cut-away view of a console for a vehicle interior according to an exemplary embodiment.
Figure 4B:
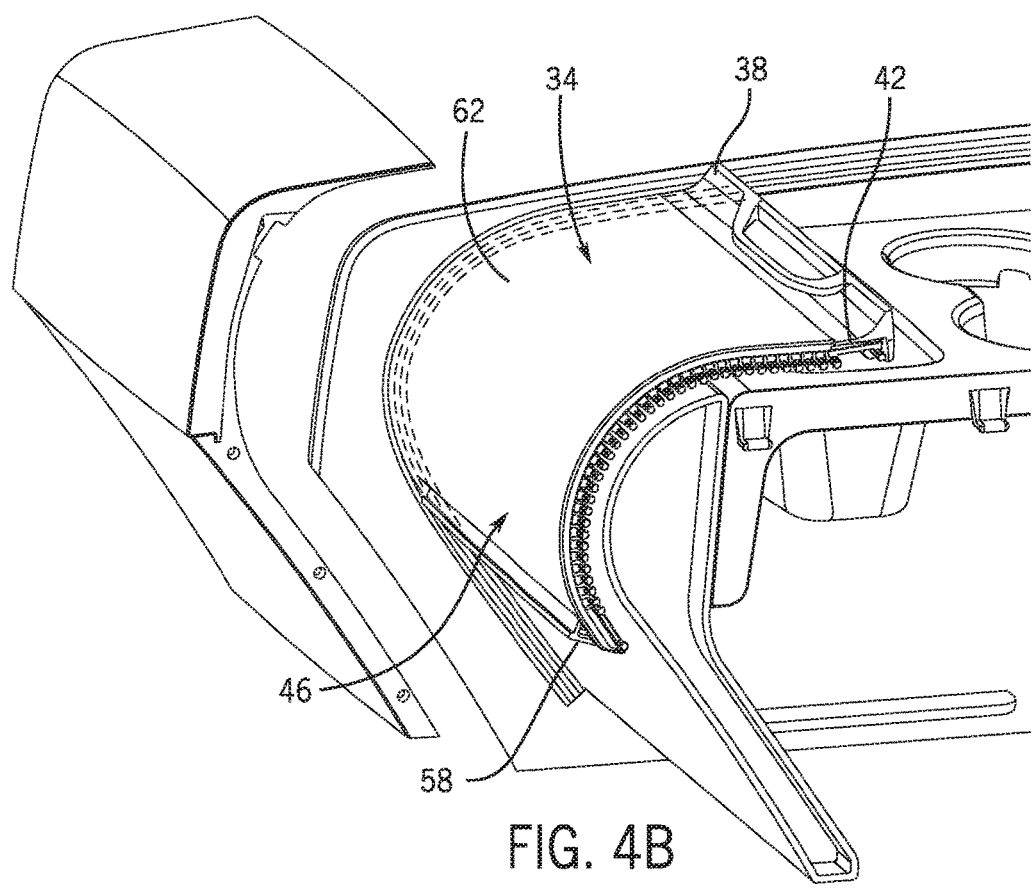
FIG. 4B is a schematic perspective detail view of the console according to an exemplary embodiment.

As shown schematically in FIGS. 4A and 4B, console 16 provides a base, tambour door 34 and tambour door 32; console 16 also provides a compartment shown as a storage compartment 48 and a cup holder compartment 36. As shown schematically in FIGS. 4A and 4B, tambour door 34 comprises a series of ribs configured to conform the contour of the tracks (e.g. a track 50, a track 52, a track 54 and a track 56, etc.). According to an exemplary embodiment, tambour door 32 comprises a series of ribs configured to conform the contour of a second track system; tambour door 32 is configured to slide within the second track system between a closed position (see FIG. 4A) and an open position. As shown schematically in FIG. 4A, the track system for tambour door 32 is located at the back portion of console 16.

As shown schematically in FIG. 4A, tambour door 34 is also supported by a track system. The track system comprises track 50, track 52, track 54 and track 56. According to an exemplary embodiment, tambour door 34 is configured to slide within the portions of the track system (e.g. track 50, track 52, track 54 and track 56). As shown schematically in FIG. 4A, tambour door 34 is in compartment 46; track 54 provides a path of travel for tambour door 34 to reach the open position; handle 38 of tambour door 34 is accessible when tambour door 34 is at the open position. According to an exemplary embodiment, tambour door 34 is configured to cover cup holder compartment 36 when tambour door 34 is within track 56; tambour door 34 is configured to divide storage compartment 48 into two storage compartments when tambour door 34 is within track 50 or track 52.

As shown schematically in FIG. 4A, tambour door 34 is in compartment 46; handle 38 remains accessible when tambour door 34 is inside of compartment 46. See also FIGS. 5 and 8. As shown schematically in FIGS. 4A and 4B, tambour door 34 comprises a feature shown as a tab 58 configured to act as a barrier or obstruction for items placed on top of tambour door 34; according to an exemplary embodiment, tab 58 is configured to engage a lip or edge 64 on the inner surface of opening 42 as tambour door 34 moves from track 56 to track 54. According to an exemplary embodiment, tab 58 provides a barrier or obstruction to prevent items placed on top of tambour door 34 from entering compartment 46 through opening 42. As shown schematically in FIGS. 4A and 4B, tambour door 34 also comprises a surface 62; surface 62 is an exterior surface to vehicle occupants and to provide a substrate for vehicle occupants to place items on tambour door 34; surface 62 of tambour door 34 is also configured to be used as an armrest for vehicle occupants when tambour door 34 is in one of the covering positions on top of a storage compartment according to an exemplary embodiment.

As shown schematically in FIG. 4A, tambour door 34 includes a feature shown as a tab mechanism providing a tab or feature 58 configured to act as a barrier or obstruction for items placed on top of a tambour door 34. While tambour door 34 is over cup holder compartment 36, tab 58 is in a deployed position and may provide a barrier or obstruction to one or more items on top of tambour door 34 (e.g. business card, coin, cell phone, etc.); tab 58 provides a barrier or obstruction for items placed on top of tambour door 34; tab 58 includes a lip or edge 74, a surface 76 and a surface 78. Surface 78 on tambour door 34 may be a ramp configured to engage the item(s) on tambour door 34; lip or edge 74 extends from outer surface 76 of tab 58; lip or edge 74 and surface 78 may provide a barrier or obstruction intended to prevent an item on outer surface 62 of tambour door 34 from sliding over the barrier and moving into opening 46. Depending on the size of the item, lip or edge 74 may extend over the item and/or outer surface 62 of tambour door 34 while tab 58 is in the open position.

As shown schematically in FIGS. 5 and 8, tambour door 34 is in compartment 46 (i.e. the open position for tambour door 34); track 54 provides a path of travel for tambour door 34; tab 58 is at the open position; handle 38 on tambour door 34 is accessible when tambour door 34 is at the open position. As shown schematically in FIG. 8, the console provides a surface 100 on the inside of the console; tab 58 is in the open position; a gap is shown between surface 100 of console 16 and surface 62 of tambour door 34. According to an exemplary embodiment, tab 58 may be in contact with surface 100 when tambour door 34 is at the open position (i.e. inside compartment 46).

As shown schematically in FIG. 9, tab 58 is located on tambour door 34; tab 58 is configured to move from the deployed position and the retracted position. As shown schematically in FIG. 9, tab 58 provides surface 76, lip or edge 74 and surface 78. According to an exemplary embodiment, when tab 58 is at the retracted position, surface 76 is intended to be in alignment with the outer surface of tambour door 34; edge 74 is configured to engage with the inner surface of console 16 to push tab 58 towards the retracted position (see FIGS. 7A to 7C and 8B to 8D). According to an exemplary embodiment, surface 78 provides a ramp on tambour door 34 to be the barrier or obstruction for items placed on top of tambour door 34; tambour door 34 provides an opening 88 to receive surface 78 when tab 58 is at the retracted position. As shown schematically in FIG. 9, tab 58 is connected to tambour door 34 by a hinge mechanism; tab 58 is configured to pivot around a pin 112 between the open position and the retracted position; a spring 114 is attached to pin 112 and is configured to engage with tambour door 34 and the bottom surface 116 of tab 58. According to an exemplary embodiment, spring 114 is biased to push tab 58 towards the open position.

Figure 6A:
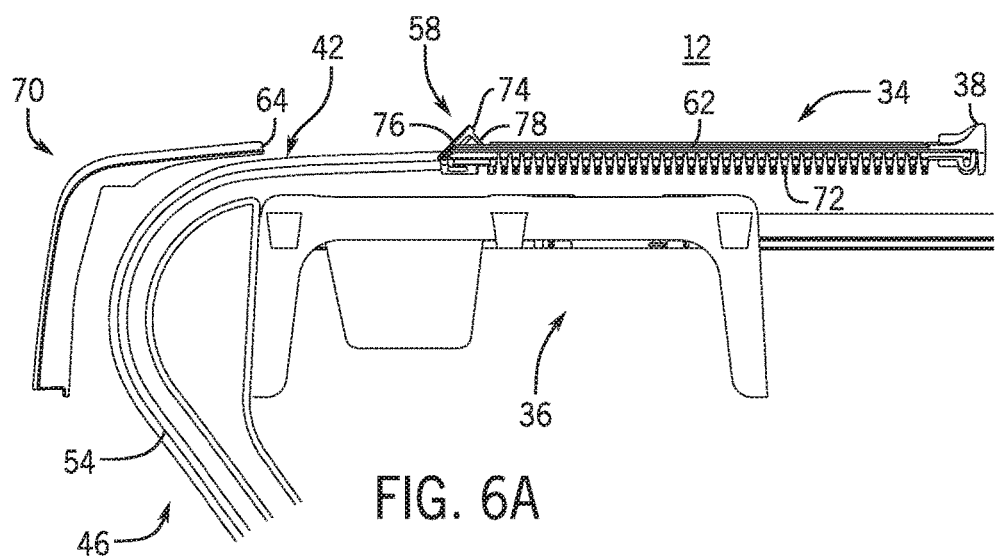
FIGS. 6A to 6C are schematic side views of a door for the console according to an exemplary embodiment.
Figure 6B:
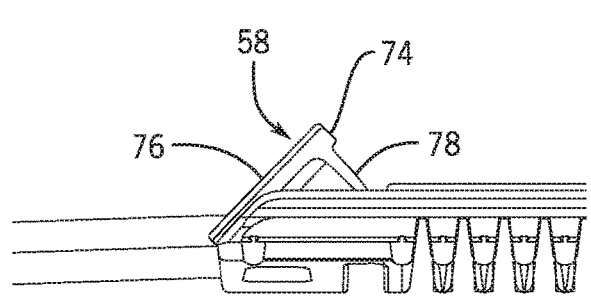
Figure 6C:
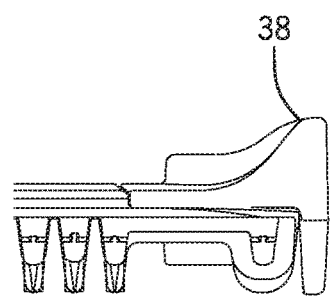

As shown schematically in FIGS. 6A to 6C, tambour door 34 is shown in the flat portion of the track system; tambour door 34 is partially covering cup holder compartment 36. As shown schematically in FIG. 6A, tambour door 34 provides surface 62 to be exterior surface to cover a series of ribs 72 underneath surface 62; tambour door also 34 comprises handle 38 to move tambour door 34 within the tracks of the track system; tambour door 34 also comprises tab 58 configured to engage lip or edge 64 of opening 42 as tambour door 34 moves towards the open position. As shown schematically in FIGS. 6A and 6B, tab 58 comprises surface 76, edge 74 and surface 78. According to an exemplary embodiment, surface 76 is configured to be in alignment with surface 62 of tambour door 34 when tab 58 is at the retracted position; edge 74 is configured to engage lip or edge 64 of console 16 to push tab 58 towards the retracted position (i.e. to push tambour door 34 into stowage track 54). According to an exemplary embodiment, when tab 58 is at the open position, surface 78 is configured to provide a barrier or obstruction for items placed on top of tambour door 34.

Figure 7A:
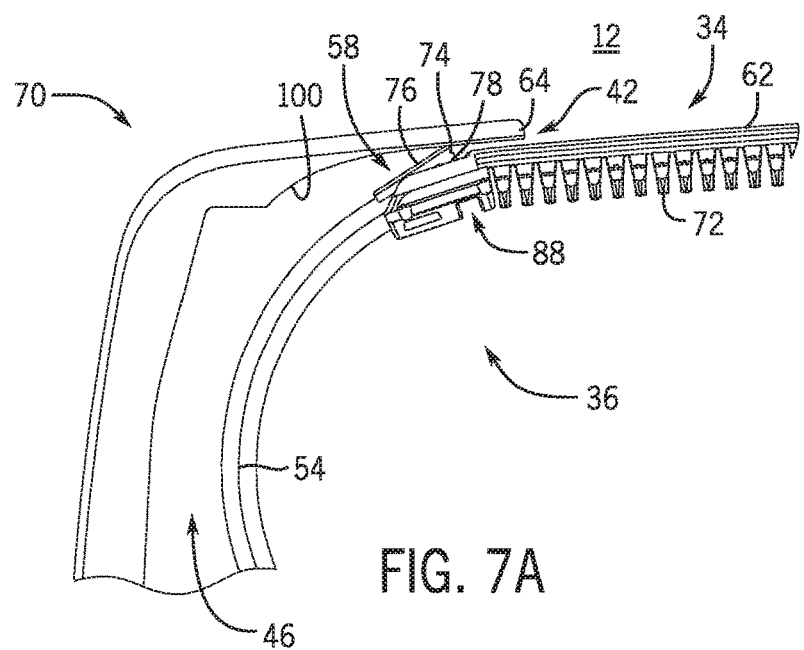
FIGS. 7A to 7C are schematic side views of a mechanism for the door according to an exemplary embodiment.
Figure 7B:
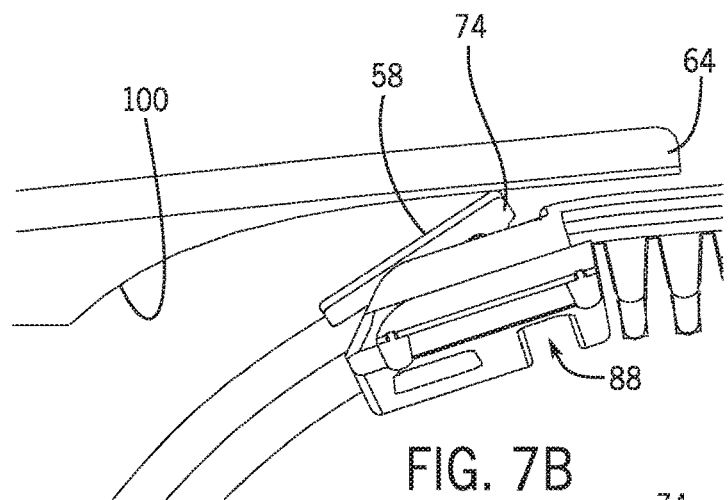
Figure 7C:
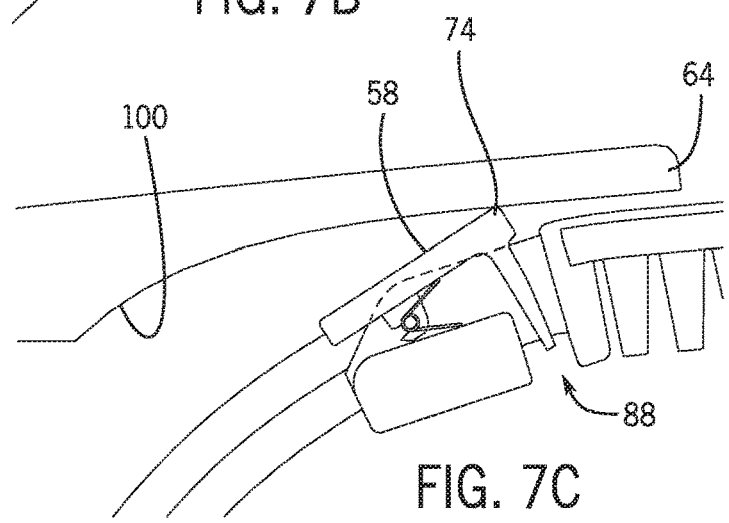

As shown schematically in FIGS. 7A to 7C, compartment 46 provides surface 100 on the inside of compartment 46. According to an exemplary embodiment, lip or edge 74 is configured to engage surface 100. As shown schematically in FIGS. 7A to 7C, tab 58 is partially retracted (i.e. between the open position and the retracted position).

Figure 8A:
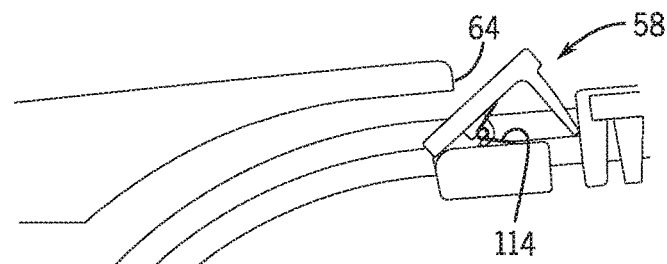
FIGS. 8A to 8E are schematic side views of the mechanism for the door according to an exemplary embodiment.
Figure 8B:
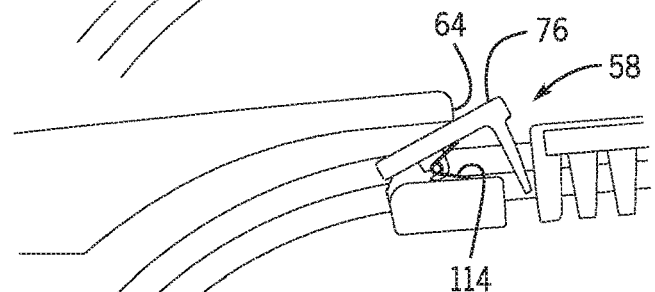
Figure 8C:
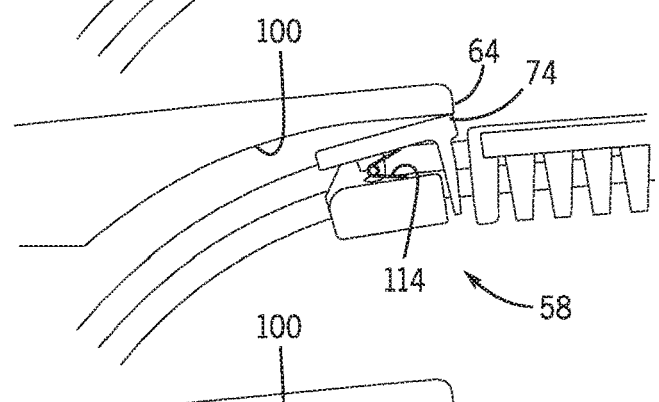
Figure 8D:
Figure 8E:
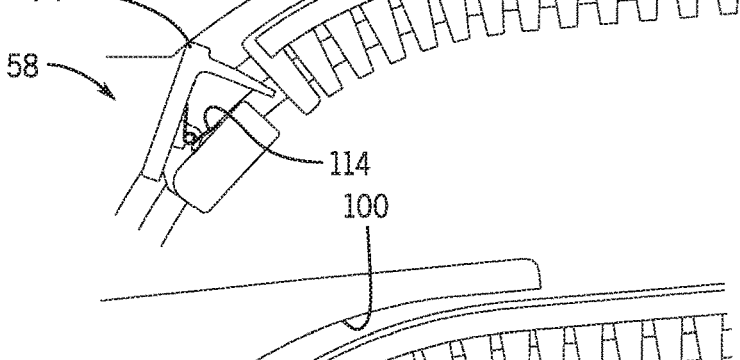

As shown schematically in FIG. 8A, tab 58 is at the open position. As shown schematically in FIG. 8B, surface 76 of tab 58 is engaged with lip or edge 64 on console 16; tab 58 is partially retracted (i.e. between the open position and the retracted position). As shown schematically in FIGS. 8C and 8D, edge 74 is engaged inner surface 100; tab 58 is partially retracted; spring 114 is partially compressed. As shown schematically in FIG. 8E, tab 58 is disengaged from surface 100; tab 58 returns to the deployed position. According to an exemplary embodiment, console 16 may provide an extended inner surface configured to engage with edge 74 of tab 58 when tambour door 34 is between the intermediate position and the open position.

Exemplary Embodiments

As shown schematically in FIG. 2, a console shown as a center console 16 and/or other areas within a vehicle interior 12 may include a flexible interior trim component (e.g. a flexible door configured to cover and expose one or more compartments). According to an exemplary embodiment, certain compartments may employ a flexible tambour door having multiple substantially parallel ribs; the parallel ribs may be configured to engage a track within the console (e.g. facilitate movement of the tambour door along an opening of the console); the tambour door may also include a substrate having a back surface facing an interior of a storage compartment within the console and a visible surface for vehicle occupants (e.g. formed from an integral outer skin) facing vehicle interior. See FIGS. 4A and 4B. According to an exemplary embodiment, an outer surface of the substrate may face interior 12 of the vehicle and may be wrapped with a cover layer to form the visible surface of the tambour door for vehicle occupants; the back surface of the substrate may be coupled to the substantially parallel ribs such that the tambour door may flex in a direction perpendicular to the orientation of the substantially parallel ribs; a configuration may enable the tambour door to match the contours of a curved storage compartment opening and curved tracks (e.g. facilitate movement of the tambour door with respect to the storage compartment opening). See FIGS. 4A and 4B. According to an exemplary embodiment, the tambour door may include a substrate that is not configured to flex; the cover layer or outer surface of the substrate is rigid; the cover layer or outer surface of the substrate is coupled to the substantially parallel ribs and is visible to vehicle occupants; the tambour door may travel linearly along linear tracks according to an exemplary embodiment.

As shown schematically in FIG. 2, a tambour door 34 includes a deployable retaining feature 58 configured to extend upward from the outer surface of tambour door 34 when deployable retaining feature 58 is in an open position. Deployable retaining feature 58 may be configured to be in the open position while tambour door 34 is in a covering position over a storage compartment. According to an exemplary embodiment, with tambour door 34 in the covering position and deployable retaining feature 58 in the open position (e.g. open position), deployable retaining feature 58 is configured to engage one or more items (e.g. one or more items from vehicle occupants, such as a business card, coins, a cell phone, etc.) adjacent to the outer surface of tambour door 34 to block movement of the item relative to tambour door 34. According to an exemplary embodiment, the deployable retaining feature may be configured to enter a retracted position while the tambour door transitions from the covering position over a storage compartment through an opening in the console to a stowed position in a door stowage compartment 46. See also FIGS. 7A to 7C. According to an exemplary embodiment, the deployable retaining feature contacts a stationary surface or lip of console 16 (e.g. above the opening) during the transition of the tambour door between the covering position and the stowed position (e.g. as the tambour door approaches and enters the opening); according to an exemplary embodiment, the stationary surface or lip is above the substrate of the tambour door, driving the deployable retaining feature toward the retracted position and enabling the tambour door to enter a door stowage compartment (e.g. a stowed position in the console). According to an exemplary embodiment, the deployable retaining feature may be substantially in alignment with the outer surface of the tambour door in the retracted position (i.e. the retracted position). As the tambour door enters the door stowage compartment, the item (e.g. business card, coin, cell phone, etc.) may also contact the lip of console 16 such that the item does not move relative to the lip and does not fall (e.g. follow the tambour door) into the door stowage compartment.

According to an exemplary embodiment, console 16 may include a storage compartment enclosed by a flexible tambour door. As shown schematically in FIG. 2, console 16 is coupled to a floor of vehicle interior 12 between a driver seat 14 and a passenger seat 14. Console 16 is configured to provide one or more compartments for storage (e.g. storage compartment(s) and/or cup holder compartment(s)) and an armrest for an occupant of one or both seats 14. As shown schematically in FIG. 2, console 16 has a front wall 18, a back wall 20, two opposed and generally symmetrical side walls 22 and a top surface 24. According to an exemplary embodiment, top surface 24 may include one or more tambour doors and a number of storage compartments may be located underneath top surface 24 and throughout console 16.

As shown schematically in FIG. 2, console 16 also includes two side panels 26 which form the main body of console 16; each side panel 26 provides one of side walls 22 of console 16 and a portion of back wall 20, front wall 18 and top surface 24; side walls 22 include a compound-curved upper contour having convex and concave portions, transitioning from raised back wall 20 and lower front wall 18. The top edges 28 of side panels 26 form part of the curved top surface 24; top surface 24 may include one or more openings that enable a vehicle occupant to access an interior of console 16 (e.g. a storage compartment); console 16 includes a back door (i.e. a tambour door 32) forming a portion of back wall 20 and/or top surface 24.

As shown schematically in FIG. 2, console 16 includes a door shown as a tambour door 34 configured to transition from one or more covering positions over one or more storage compartments and a stowed position. According to an exemplary embodiment, door 34 includes a handle 38 that enables a vehicle occupant to slide door 34 between the covering position(s) and the stowed position. As shown schematically in FIG. 2, door 34 is in a covering position over one or more storage compartments; according to an exemplary embodiment, door 34 may also be in a covering position over cup holder compartment 36 which may also be considered a storage compartment. As shown schematically in FIG. 3, by sliding door 34 forward toward the stowed position, at least one storage compartment located within the console 16 is exposed. According to an exemplary embodiment, by sliding door 34 forward through an opening 42, door 34 may be moved generally downward into a door stowage compartment 46 below or internal to console 16.

According to an exemplary embodiment, door 34 is a tambour door having a series of substantially parallel ribs coupled to a flexible substrate. See FIGS. 4A and 4B. According to an exemplary embodiment, the ribs are configured to engage a track within side walls 22; the flexible substrate enables door 34 to flex and to accommodate the contours of opening 30 (e.g. such that door 34 may move within a curvilinear path). According to an exemplary embodiment, the flexible substrate also enables door 34 to serve as an armrest for the vehicle occupants, reducing the space associated with providing a separate door 34 and armrest. See FIG. 2.

According to an exemplary embodiment, a storage compartment may be located within an overhead console, door panel, instrument panel, or other region of a vehicle interior; the storage compartment may include a flexible tambour door. According to an exemplary embodiment, other flexible interior trim components (including door 34) may include similar parallel ribs coupled to a substrate.

According to an exemplary embodiment, side walls 22 may include rails or tracks (e.g. a track system) configured to facilitate movement of door 34 within the rails or tracks. The rails or tracks may define a curved path to facilitate movement of door 34 from the covered position over a cup holder compartment 36 to the stowed position in the door stowage compartment 46.

As shown schematically in FIG. 4A, console 16 includes a storage compartment 48 and a cup holder compartment 36; tambour door 34 is configured to slide into a track 50 of a storage compartment 48 or a track 52 of storage compartment 48 (track 50 and track 52 are part of a multi-track system). Storage compartment 48 may be partitioned into multiple storage compartments (e.g. two storage volumes) and the multiple storage compartments may establish storage volumes based on the position of tambour door 34 (e.g. on bottom track 52 or on track 50); a driver or passenger may move the tambour door 34 onto track 52 or track 50 based on the desired storage compartment size. Tambour door 34 may include a flexible substrate covering parallel ribs and the parallel ribs may engage track 50 or track 52. The structure of tambour door 34 enables tambour door 34 to flex and accommodate contours of track 50 and/or track 52. See also FIG. 5.

According to an exemplary embodiment, tambour door 34 is configured to cover cup holder compartment 36 and or storage compartment 48; tambour door 34 may be stowed in a door stowage compartment 46; tambour door 34 may be transitioned through opening 42 into the door stowage compartment. According to an exemplary embodiment, the structure of tambour door 34 enables tambour door 34 to flex and accommodate contours of a stowage track 54. See FIGS. 4A, 5 and 8. Stowage track 54 may define a portion of the track system used for translating tambour door 34 from a covered position and a stowed position. As shown schematically in FIGS. 4A and 5, the track system includes stowage track 54, a flat portion 56 over cup holder compartment 36, track 52 and track 50. According to an exemplary embodiment, storage compartment 48 may include track 50, track 52 and a track between track 50 and track 52; according to an exemplary embodiment, storage compartment 48 may be partitioned into a greater variety of storage volumes); one track may partition storage compartment 48 (e.g. bottom track 52). According to an exemplary embodiment, the track system may provide multiple tracks in various configurations; variations or changes to the track system may occur to one with ordinary skill in the art.

According to an exemplary embodiment, tambour door 34 may be in a backward position or a covering position in or over a portion of storage compartment 48 or over cup holder compartment 36; tambour door may be in a stowed position in door stowage compartment 46. Item(s) (e.g. business card, coin, cell phone, etc.) may be placed by a vehicle occupant on tambour door 34 while tambour door 34 is accessible to a vehicle occupant (e.g. while tambour door 34 is not in the stowed position). The item(s) may be remained on tambour door 34 when tambour door 34 is stationary and/or when tambour door 34 is being transitioned between portions of the track system by a vehicle occupant (e.g. from one of the covering positions to the stowed position). According to an exemplary embodiment, items on tambour door 34 may slide across tambour door 34 due to sudden change in acceleration of the vehicle. According to an exemplary embodiment, tambour door 34 includes a deployable retaining feature 58 to engage the item(s) (e.g. a business card, a coin, a cell phone, etc.) and to block the item(s) from falling off tambour door 34 (e.g. into cup holder compartment 36, door stowage compartment 46, and/or storage compartment 48). While tambour door 34 is in the backward position (e.g. on top track 50 or bottom track 52) over storage compartment 48, deployable retaining feature 58 is open (e.g. extended or in an open position) such that items on tambour door 34 may contact deployable retaining feature 58; deployable retaining feature 58 may block items on tambour door 34 from falling into storage compartment 48. Tambour door 34 is in the covering position (e.g. on flat portion 56) over cup holder compartment 36; deployable retaining feature 58 is open (e.g. extended or in the open position) such that items on tambour door 34 may contact deployable retaining feature 58; deployable retaining feature 58 may block items on tambour door 34 from falling into cup holder compartment 36. As shown schematically in FIGS. 7A to 7C, tambour door 34 transitions from the flat portion 56 of multi-track system to stowage track 54 (e.g. in door stowage compartment 46), deployable retaining feature 58 interfaces with opening 42 to block items from falling into door stowage compartment 46.

Deployable retaining feature 58 extends upwardly from and at an angle to an outer surface 62 of tambour door 34 (see FIG. 6A); deployable retaining feature 58 is configured to contact a stationary lip 64 of console 16 while transitioning from one of the covering positions to the stowed position in door stowage compartment 46 (see FIG. 8B); deployable retaining feature 58 contacts stationary lip 64, deployable retaining feature 58 is driven toward a retracted position (e.g. substantially aligned with outer surface 62 of tambour door 24) to enable tambour door 34 to move through opening 42 in console 16 and into door stowage compartment 46 (see FIGS. 7A to 7C). Once the deployable retaining feature 58 moves beyond lip 64 of console 16, deployable retaining feature 58 may move back to the open position. See FIGS. 8D and 8E.

Console 16 includes a track system for tambour door 34; the track system includes track 50, track 52, flat portion 56 and stowage track 54. As shown schematically in FIGS. 5 and 8, tambour door 34 is in the stowed position in door stowage compartment 46; the back tambour door 34 is positioned on upper track 60 (upper track 60 may be part of another track system (e.g. a separate track from the multi-track system) and upper track 60 curves around an outside of storage compartment 48).

As shown schematically in FIG. 4A, tambour door 34 of the track system may be transitioned from the stowed position to a covering position over cup holder compartment 36 (e.g. onto flat portion 56 of the multi-track system); tambour door 34 may also be transitioned from the covering position over cup holder compartment 36 onto top track 50 or bottom track 52 (e.g. into a covering position inside and/or over a portion of storage compartment 48); tambour door 34 may serve as a partition to generate multiple storage volumes in storage compartment 48 (e.g. two storage volumes). See FIGS. 4A and 5.

As shown schematically in FIG. 4A, tambour door 34 is stowed in a door stowage compartment 46. While in door stowage compartment 46, deployable retaining feature 58 may be in the open position; outer surface 62 of tambour door 34 may remain in contact with the lip 64 of console 16. Door stowage compartment 46 may be sealed from cup holder compartment 36, other storage compartment(s) of console 16 and interior 12 of vehicle 10; items may be blocked from falling into door stowage compartment 46.

According to an exemplary embodiment, tambour door may be in a covering position over a storage compartment (e.g. cup holder compartment 36). As shown schematically in FIG. 4A, tambour door 34 includes parallel ribs 72 configured to engage a track (e.g. flat portion 56 of the track system). As shown schematically in FIGS. 4A and 4B, parallel ribs 72 are substantially covered by a flexible substrate having an outer surface 62 that faces vehicle interior 12; flexible substrate enables tambour door 34 to flex as tambour door 34 moves along the portions of the track system.

According to an exemplary embodiment, tambour door 34 slides along the multi-track system (e.g. flat portion 56 and/or storage track 54) toward and through opening 42; deployable retaining feature 58 comes into contact with stationary lip 64 of top structure 70 (and inner surface of top structure 70) of door stowage compartment 46 of console 16. Outer surface 76 of deployable retaining feature 58 contacts stationary lip 64 of top structure 70. Tambour door 34 continues to move in direction 40; retaining surface 78 of deployable retaining feature 58 moves into an opening 88 of deployable retaining feature 58 or an opening of outer surface 62 of tambour door 34; outer surface 76, retaining lip 74 and retaining surface 78 rotate a hinge point 90 of deployable retaining feature 58 to the retracted position. Hinge point 90 is part of a hinge assembly that may include a compression spring, a coil spring or some other type of spring or biasing mechanism configured to urge deployable retaining feature 58 toward the open position.

Retaining lip 74 of deployable retaining feature 58 may urge an item (e.g. business card, coin, cell phone, etc.) on tambour door 34 away from opening 42 of door stowage compartment 46 as deployable retaining feature 58 transitions to the retracted position; once deployable retaining feature 58 passes stationary lip 64 in direction 40, the item itself may contact stationary lip 64 as tambour door 34 moves toward door stowage compartment 46. The item may be blocked from falling into door stowage compartment 46 and may remain in contact with stationary lip 64 of top structure 70 as tambour door 34 moves into the stowed position.

According to an exemplary embodiment, tambour door 34 is stowed on stowage track 54 of the multi-track system; deployable retaining feature 58 is in an open position; outer surface 76 of deployable retaining feature 58 may be in contact with an inner surface 100 of top structure 70 of door stowage compartment 46 (deployable retaining feature 58 may be in a retracted position).

The stowage track 54 is configured to route tambour door 34 away from inner surface 100 of top structure 70; outer surface 76 of deployable retaining feature 58 contacts inner surface 100 of door stowage compartment 46 at one point (e.g. after passing stationary lip 64) and moves away from inner surface 100 of door stowage compartment 46 once tambour door 34 moves farther into door stowage compartment 46; deployable retaining feature 58 may be in the open position while tambour door 34 is in the stowed position. Tambour door 34 remains in contact with or at a narrow distance from stationary lip 64 of top surface 70; the narrow distance is substantially less than the total protrusion of outer surface 76 of deployable retaining feature 58 when deployable retaining feature 58 is open. Handle 38 of tambour door 34 extends upwardly from outer surface 62 of tambour door 34 (such that tambour door 34 is blocked from extending farther into door stowage compartment 46 by the contact between handle 38 and lip 64); tambour door 34 may be moved from the stowed position in door stowage compartment 46 to one of the covering positions by accessing handle 38 of tambour door 34 from interior 12 of vehicle 10. The driver and/or passenger may move tambour door 34 into a covering position over cup holder compartment 36 or storage compartment 48 without reaching through opening 42 into door stowage compartment 46 to retrieve tambour door 34.

As shown schematically in FIG. 9, opening 88 is configured to receive retaining surface 78 as deployable retaining feature 58 moves from the open position to the retracted position; deployable retaining feature 58 is in the retracted position or approaching the retracted position, outer surface 76 of deployable retaining feature 58 may be substantially aligned with outer surface 62 of tambour door 34, or approaching a position where outer surface 76 is substantially aligned with outer surface 62 of tambour door 34; outer surface 76 of deployable retaining feature 58 may be offset from outer surface 62 of tambour door 34 in direction 40 and/or in direction 44 when deployable retaining feature 58 is in the retracted position (e.g. completely retracted). The outer surface 76 may be slightly above or slightly below outer surface 62 or there may be a gap between retaining lip 74 and outer surface 62 or a combination of both; outer surface 76 of deployable retaining feature 58 may extend along an entire width of deployable tambour door 34 (e.g. in direction 110) or outer surface 76 may extend over only a portion (e.g. central portion) of tambour door 34; outer surface 76 may be continuous (e.g. continuously flat) over a length of tambour door 34 or outer surface 76 may be combed (e.g. partitioned into individual components or fingers); outer surface 76 may be smooth or textured and outer surface 76 may be made of or covered by the same material as a main portion of outer surface 62 of tambour door 34, or it may be made of or covered by material.

According to an exemplary embodiment, engagement with an item on outer surface 62 of tambour door 34 may be enhanced by increasing the friction of surface material. A textured finish of outer surface 76, retaining surface 78 and/or retaining lip 74 may increase the likelihood that certain items (e.g. a cell phone) are blocked from falling into door stowage compartment 46 of console 16.

According to an exemplary embodiment, a continuous outer surface 76, retaining surface 78, and/or retaining lip 74 may be desired (such that smaller items (e.g. coins) are blocked from falling from tambour door 34). According to an exemplary embodiment, combed outer surface 76, retaining surface 78, and/or retaining lip 74 may be desired.

According to an exemplary embodiment, deployable retaining feature 58 is configured to move from the open position to the retracted position by pivoting around a pin 112 (e.g. a hinge mechanism); pivoting feature 112 includes a spring 114 (e.g. a coil spring); spring 114 exerts a spring force on a bottom surface 116 of deployable retaining feature 58, which urges deployable retaining feature 58 toward the open position. When outer surface 76 of deployable retaining feature 58 contacts stationary lip 64 of outer structure 70 of console 16, stationary lip 64 exerts a force on outer surface 76 which may exceed the spring force exerted on bottom surface 116 of deployable retaining feature 58 by spring 114; deployable retaining feature 58 rotates about pivoting feature 112 into a retracted position until outer surface 76 is no longer in contact with stationary lip 64 or inner surface 100 of top structure 70. Spring 114 may be a coil spring, a compression spring or some other type of spring or biasing mechanism; spring 114 may be designed as a separate part of the tambour door assembly. According to an exemplary embodiment, necessary features of the spring 114 may be integrated into the material of outer surface 76, retaining surface 78, retaining lip 74 or any other portion or part of tambour door 34.

According to an exemplary embodiment, deployable retaining feature 58 is configured to translate up and down relative to the stationary lip 64. When deployable retaining feature 58 is in a covering position over cup holder compartment 36, deployable retaining feature 58 is in an open position and extending from outer surface 62 of tambour door 34. When deployable retaining feature 58 contacts stationary lip 64, deployable retaining feature 58 translates downwardly such that tambour door 34 can fit through opening 42 into door stowage compartment 46; deployable retaining feature 58 may translate downwardly due to a tapered surface (e.g. outer surface 62) of deployable retaining feature 58 contacting stationary lip 64, such that a portion of a force translated from stationary lip 64 against the tapered surface (e.g. outer surface 62) of deployable retaining feature 58 is directed downwardly; deployable retaining feature 58 may then be pushed downwardly into opening 88, such that tambour door 34 fits through opening 42.

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. All such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A vehicle trim component configured to provide support for an object comprising:
(a) a base; and
(b) a door coupled to the base configured for movement from a closed position to an open position through an intermediate position;
wherein the door comprises a tab configured for movement from a deployed position to a retracted position in response to movement of the door from the closed position toward the open position.

2. The vehicle trim component of claim 1 wherein the base comprises an edge configured to move the tab from the deployed position to the retracted position.

3. The vehicle trim component of claim 2 wherein the edge is configured to move the tab from the deployed position to the retracted position (a) as the door moves from the closed position to the intermediate position and (b) as the door moves from the intermediate position to the closed position.

4. The vehicle trim component of claim 2 wherein the tab comprises a tapered surface configured to contact the edge.

5. The vehicle trim component of claim 1 wherein the tab is configured to be in the deployed position when the door is in the closed position and the open position.

6. The vehicle trim component of claim 1 wherein the tab is configured to be in the retracted position when the door is in the intermediate position.

7. The vehicle trim component of claim 1 wherein the tab is configured to move from the deployed position to the retracted position as the door is moved from the closed position to the intermediate position.

8. The vehicle trim component of claim 1 wherein the tab comprises a spring configured to move the tab from the retracted position to the deployed position.

9. The vehicle trim component of claim 1 wherein the tab is configured to prevent the object from moving relative to the door.

10. The vehicle trim component of claim 1 wherein the tab is configured to move the object relative to the base as the door moves from the open position to the closed position.

11. The vehicle trim component of claim 1 wherein the base comprises an opening and wherein the tab is configured for movement from a deployed position to a retracted position as the tab moves through the opening.

12. The vehicle trim component of claim 11 wherein the door comprises a handle and wherein the handle contacts the edge to prevent movement of the door.

13. The vehicle trim component of claim 1 wherein the tab is configured to be in the retracted position when the door is in the open position.

14. The vehicle trim component of claim 13 wherein the base comprises a surface configured to prevent the tab from moving to the deployed position.

15. The vehicle trim component of claim 1 wherein movement of the tab comprises rotation.

16. The vehicle trim component of claim 1 wherein the base comprises a console; the door comprises a tambour door; the tab comprises a deployable retaining feature; the closed position comprises a covering position; the open position comprises a stowed position; and the retracted position comprises a second closed position.

17. A vehicle trim component comprising:
(a) a base;
(b) a door coupled to the base configured for movement from a closed position to an open position; and
(c) a mechanism comprising a tab coupled to the door;
wherein the tab of the mechanism extends from a surface of the door and is configured for movement from a deployed position to a retracted position; and
wherein the mechanism comprises a spring configured to move the tab from the retracted position to the deployed position.

18. The vehicle trim component of claim 17 wherein the base is configured to compress the spring to move the tab of the mechanism to the retracted position.

19. A vehicle trim component configured to provide support for an item comprising:
(a) a base; and
(b) a door coupled to the base configured for movement from a closed position to an open position through an intermediate position;
wherein the door comprises a feature configured to prevent the item from moving relative to the door; and
wherein the feature of the door is configured to move the item relative to the base as the door moves from the open position to the closed position.

20. The vehicle trim component of claim 19 wherein the feature on the door comprises at least one of (a) a tab; (b) a barrier; (c) an obstruction; (d) a surface; (e) a projection; (f) a lip; (g) a mechanism; (h) a mechanism comprising a spring; (i) a deployable retaining feature; (j) a feature configured to block the item from a gap between the door and the base; (k) a feature configured to block a gap between the door and the base; (l) a feature configured to prevent the item on a surface of the door from moving into a gap between the door and the base; (m) a feature configured to extend from a surface of the door to retain the item; (n) a feature configured to provide an obstruction to the item relative to a gap at the base as the door moves between the open position and the closed position; (o) a feature extending from the door into an opening in the base; (p) a tab configured to retain the item as the door moves from the closed position to the open position; (q) a tab configured to move the item relative to the base as the door moves from the open position to the closed position; (r) a tab configured to prevent the item from moving relative to the door.

* * * * *